United States Patent [19]

Fricker

[11] 4,376,241
[45] Mar. 8, 1983

[54] EROSIVE CUTTING MACHINE FOR THE FINAL MACHINING OF PUNCHING AND CUTTING TOOLS

[75] Inventor: Paul Fricker, Locarno, Switzerland

[73] Assignee: A.G. für Industrielle Elektronik AGIE, Losone, Switzerland

[21] Appl. No.: 253,937

[22] PCT Filed: May 9, 1979

[86] PCT No.: PCT/CH79/00067
§ 371 Date: May 16, 1980
§ 102(e) Date: May 16, 1980

[87] PCT Pub. No.: WO80/02394
PCT Pub. Date: Nov. 13, 1980

[51] Int. Cl.³ .............................................. B23P 1/08
[52] U.S. Cl. ................................................ 219/69 W
[58] Field of Search ............... 219/69 W, 69 M, 69 V

[56] References Cited

U.S. PATENT DOCUMENTS

3,731,044 5/1973 Ullmann et al. ................ 219/69 W
4,123,645 10/1978 Shichida et al. ................ 219/69 W
4,307,279 12/1981 Inoue et al. ..................... 219/69 W Primary Examiner—C. C. Shaw
Attorney, Agent, or Firm—Frishauf, Holtz, Goodman & Woodward

[57] ABSTRACT

Erosive working machine for cutting prepared closed inner shapes (15) and closed outer shapes (16) of a workpiece (12) fixed by a workpiece holder by means of a filamentary or strip electrode (14) arranged on guidance means (13, 18). At least one guidance means (13, 18) is arranged on a motor-rotatable rotating mechanism (20) in such a way that the center line (23) of rotating mechanism (20) at at least one geometrical locus coincides with the center of the cross-section of electrode (14). Thus, during the erosion process, a collision between the guidance means (13, 18) and the closed inner shape (15) or closed outer shape (16) or a tool holder (11) is avoided.

17 Claims, 8 Drawing Figures

EROSIVE CUTTING MACHINE FOR THE FINAL MACHINING OF PUNCHING AND CUTTING TOOLS

The invention relates to an erosive cutting machine for the final machining of prepared closed inner shapes and closed outer shapes of a workpiece fixed by a workpiece holder by means of a filamentary or strip electrode arranged on guidance means.

BACKGROUND

Figure 1A:
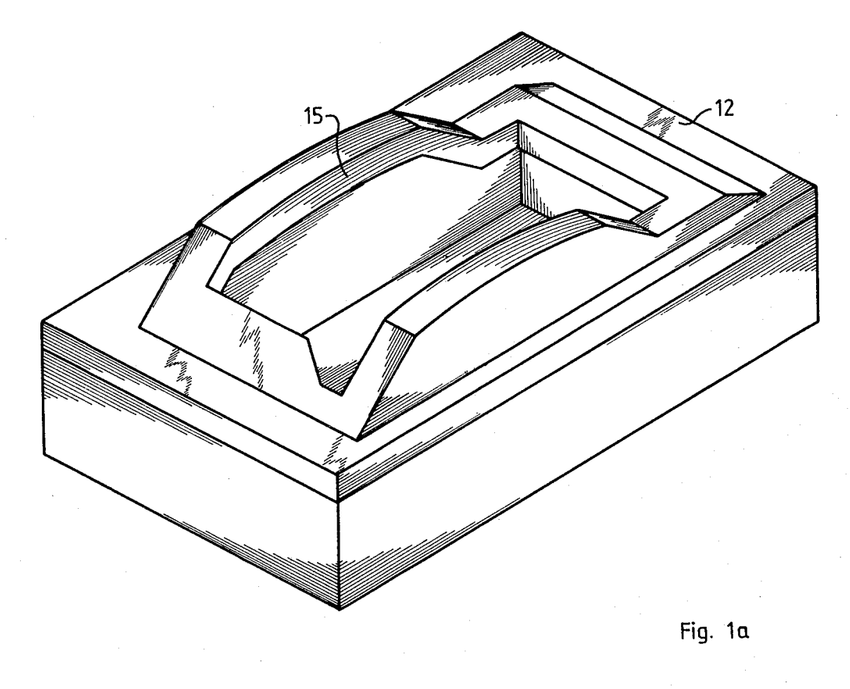
FIG. 1a and 1b are punch elements to be made by the machine apparatus.
Figure 1B:
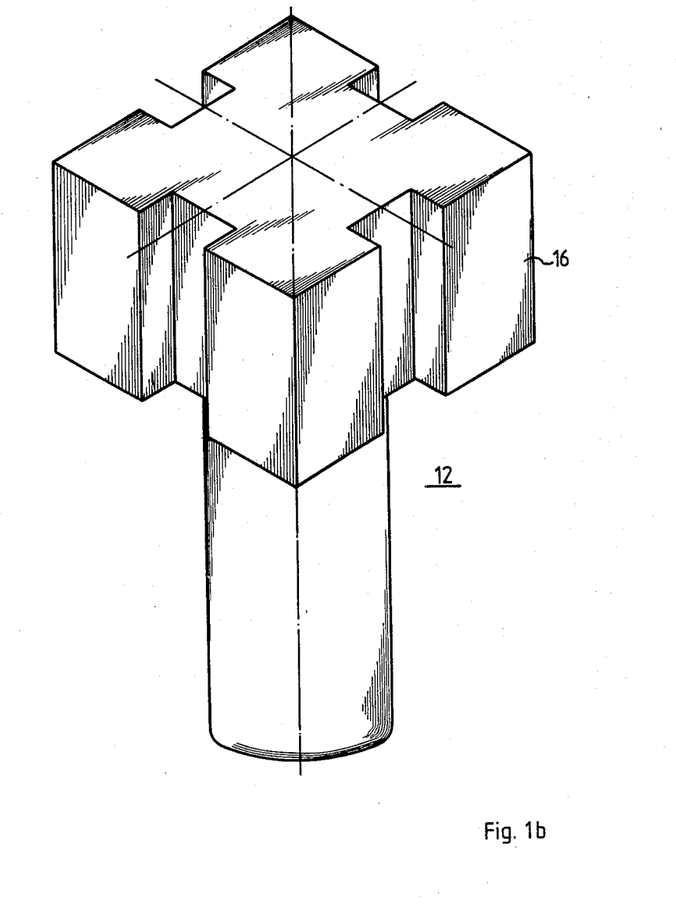

Closed workpieces, e.g. punching or cutting tools have in many cases the feature that the contour to be cut with the electrode is not reachable from the outside, because the workpiece walls block access of the electrode and the guide means carrying the electrode. FIG. 1a shows such a cutting tool. The spatial dimensions are length 3 m, width 2 m and height 1.5 m. Such a cutting tool is used for cutting sheet metal parts such as e.g. automobile bodies after thay have been shaped. As is shown, after shaping, said sheet metal parts have material projecting beyond the shape limits. This material must be cut off by the cutting tool shown in FIG. 1a. The manufacture of such a cutting tool is very complicated, because the contour to be cut out represents a closed inner shape. An erosion machine can only cut this contour if the wire guide is particularly long. However, this means a considerable vibration of the electrode during the erosion process. Thus, the requisite precision would not be maintained. The cutting tool can obviously have smaller spatial dimensions than those of FIG. 1a. In the case of a smaller tool, an erosive cutting machine could not cut the closed inner shape, even with lengthened wheel guidance means. FIG. 1b shows a punch having a closed outer shape and can either be a blanking punch or a cutting punch. The external dimensions of the punch can be up to a few meters. The closed outer shape of the punch cannot be machined in one operation with the known working methods, because it is fixed in a clamping system and the working machine, e.g. the erosive cutting machine, would collide with the clamping system. To avoid such a collision, the closed outer shape can only be machined in parts. The punch must then be reclamped in the clamping system and the new alignment then takes place between punch and erosive electrode. As a result of these difficulties, manufacture of such cutting and punching tools has taken a considerable time and is very complicated, which leads to high costs.

THE INVENTION

The problem of the invention is to obviate these difficulties or disadvantages occurring in the manufacture of special tools. The invention also aims at transferring the advantages of erosive machining by means of a filamentary or strip electrode to the present specifically shaped workpieces. The invention also aims at attaining the aformentioned advantages by means of a simple constructional solution, so that one of the constructional embodiments according to the invention can be installed on existing erosion machines.

According to the invention this problem is solved in that for avoiding a collision between the guidance means and the closed inner shape or the closed outer shape and the workpiece holder at least one guidance means is provided on the motor-rotatable rotating mechanism, whose centre line coincides at at least one geometrical locus with the centre of the cross-section of the electrode.

Important features of the constructions according to the invention can be gathered from the claims.

DRAWINGS:

The figures show

Figure 2:
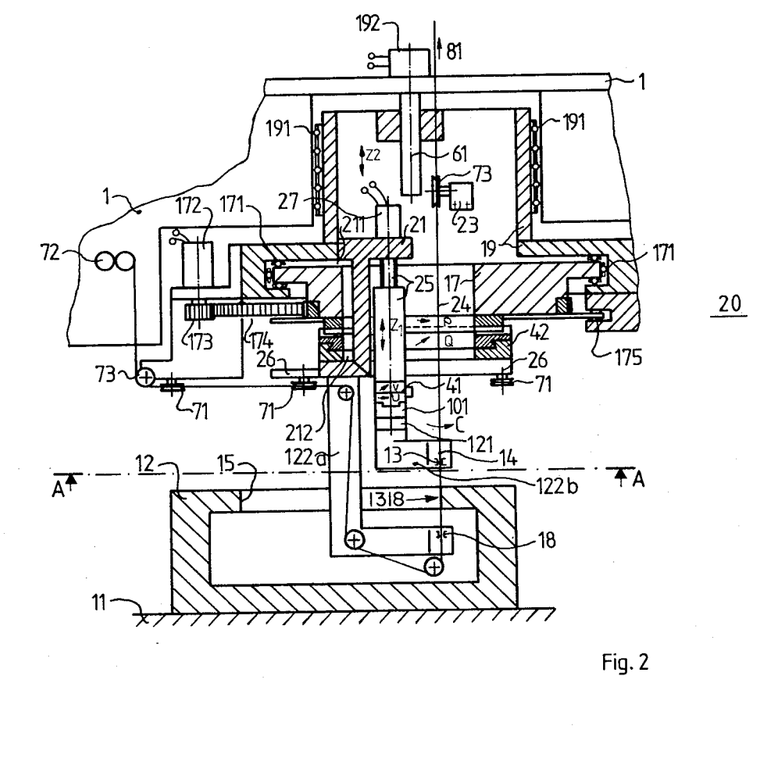
FIG. 2 an embodiment of the invention where, as desired, one or two guidance means for the electrode are provided on a rotating mechanism.

FIG. 2 is a part sectional representation of the machining head of an erosive cutting machine. Such a machining head with the guidance elements for the filamentary or strip electrode can be constructed in the manner described in U.S. Pat. No. 3,891,819, U.S. Pat. No. 3,928,163 and U.S. Pat. No. 3,987,270 . According to FIG. 2, the working head which is fixed to the not shown erosion machine carries the rotating mechanism 20 in a special recess. This rotating mechanism is displaceably arranged in the working or machining head 1 by means of bearing 191. The drive motor 192 moves the spindle 61 in such a way that the entire rotating mechanism 20 can be moved upwards or downwards. The electrical terminals are symbolically shown in motor 192, which can be operated by a not shown electrical control mechanism. The rotating mechanism 20 comprises a fixed structural member 19 and the rotary structural member 17, the latter being rotatably mounted in the fixed structural member 19 in bearing 171. Rotation is effected by motor 172 connected to a not shown electrical control circuit by means of the indicated terminals. Pinion 173 moves the toothed belts 174 engaging in corresponding mating teeth of the rotating structural member 17, so that the latter can be rotated at random either to the right or to the left. A brake 175 is provided which stops the rotary structural member 17 in the desired position. The rotary structural member 17 has a cross-table 42 at the lower end. The upper table can move in direction P and the lower table in direction Q. The two directions are indicated by arrows in FIG. 2 and are displaced by 90° from one another. On cross-table 42 is provided the support structure 21, which carries the rollers 71 for the filamentary or strip electrode 14. The special features of said rollers 47 are described in conjunction with FIG. 5. Electrode 14 is conveyed from the supply side, which in FIG. 2 is shown as a delivery spool 72, via guide rollers or pulleys 71, 73 to the guidance means 13, 18 between which the work zone 1318 is located; and from there to the discharge side 81. During the erosive machining process, electrode 14 moves at a constant speed from the supply side 72 to the discharge side 81. The guidance means 13, 18, which are only symbolically shown and in reality are constructed in the manner described and shown in the aforementioned U.S. Patents, are fixed to guidance means supports 122a, 122b. One guidance means 13 is arranged with its support 122b on a cross-slide 41, which can be moved in direction V and direction U. This movement is indicated by respective arrows in FIG. 2. Reference numerals 101 and 121 indicate a rotary table and a spacer, which will be described in greater detail hereinafter. Cross-table 42 is fixed to a movement member 25, comprising a sleeve and a spindle. The spindle is moved in one or other direction by motor 23. This movement leads to a displacement of cross-slide 42, arm 122 b and guidance means 13 in direction Z1. This direction, either upwards or downwards is indicated by arrows. Motor 23 is correspondingly controlled by means of terminals from a not shown electrical circuit arrangement and is fixed to the support structure 21. In a special manner, support structure 21 can either be connected to the fixed part 19 or indirectly with cross slide 42 of rotating mechanism 20. This will be described in greater detail hereinafter. Connecting means 211 and 212, which can be constructed as clamping, screw or plug connections, constitute the connection either with part 19 or cross slide 42 of the rotating mechanism in such a way that in each case one of the two connecting means forms the connection and the other is free. If e.g. connecting means 211 connects support structure 21 to the fixed part 19 of rotating mechanism 20, the other connecting means 212 must interrupt the connection between support structure 21 and cross-slide 42. If support structure 21 is fixed to cross-slide 42, connecting means 212 must provide the connection and connecting means 211 must interrupt the connection between rotating mechanism 20 and fixed part 19. If the support structure 21 is connected to the cross-slide 42 or support structure 26, both arms 122a, 122b or guidance means 13, 18 are jointly moved with the rotating mechanism 20. If the support structure is connected to the fixed part 19, the rotary part 17 of rotating mechanism 20 now only rotates arm 122 with guidance means 18 in one or other direction. In this case, the other guidance means 13 connected with arm 122b does not rotate. These two alternatives, that is, joint rotation of the two guidance means 13, 18 or rotation of only one guidance means 18) will be described in greater detail hereinafter in conjunction with the various working methods. FIG. 2 is a sectional view of the cutting tool of FIG. 1a. By means of the embodiments of FIGS. 2, 3b and 4 and 6, the cut surface 15 is to be worked by means of electrode 14. It is assumed that the tool of FIG. 1a has already been roughly machined. Electrode 14 now serves to produce the final cut surface 15. The cutting tool 12 of FIG. 1a is called the workpiece 12 in the following description of FIGS. 2, 3b, and 4 and 6.

According to FIG. 2, the cut surface 15 of workpiece 12 is machined by introducing the lower arm 122 with guidance means 18 into the opening of workpiece 12. Wire electrode 14 has already been supplied from the supply side 72 via the various guide pulleys 71 and 73 to the guidance means 18, 13 and then to the discharge side 81. Hereinafter, a filamentary electrode is used for machinging purposes, so that the term wire electrode is often employed. It is assumed that the support structure 21 to which is fixed the upper arm with the guidance means 13 is secured by connecting means 212 to structural member 26. Prior to the start of the actual erosive cutting of the surface 15 of workpiece 12, it is necessary to align the wire electrode 14. This is done by moving cross-slide 41 in directions U and/or V until wire electrode 14 is coaxial to the centre line 23 of rotating mechanism 20. During this coaxial positioning, wire electrode 14 is located somewhere within the opening defined by the cut surface 15 of workpiece 12. It is essential for the wire electrode to be parallel to the centre line 23. In the next state, cross-slide 42 is moved in directions P and Q until the wire electrode 14 between the two guidance means 13 and 18 is accurately centered with the centre line 23 or with the rotation axis 24 of rotating mechanism 20. As in this case support structure 21 is connected to structural member 26 and therefore also to the lower arm 122 of guidance means 18, the two guidance means move together with the cross-slide 42. This means that the parallel position of wire electrode 14 with respect to the centre line 20 is not changed by the movement of cross-slide 42. If wire electrode 14 coincides with centre line 23, the arms 122a, 122b of the two guidance means 13 and 18 are adjusted in such a way that the arms 122a, 122b are precisely at a right angle to the cut surface 15 of workpiece 12. During the erosive machining of cut surface 15, the entire machining head 1 of FIG. 2 is moved in the way it is controlled by an electronic control system. Such electronic control systems are adequately known and will not be described in detail here. Electronic control systems are for example described in U.S. Pat. No. 3,859,186, U.S. Pat. No. 3,873,102, U.S. Pat. No. 3,975,607 and U.S. Pat. No. 4,045,641. When machining the cut surface 15 of workpiece 12, it is ensured that the arms are always at a right angle to the cut surface. The distance between the two guidance means 13 and 18 is called the spacing and should be kept as small as possible, so that the wire electrode 14 does not vibrate unnecessarily during erosive machining. It is therefore frequently necessary for the two guidance means to follow the three-dimensional shape of the cut surface 15 without varying the spacing. This is brought about in that the motor 192 of FIG. 2 can move the entire rotating mechanism including fixed part 19, 20 upwards or downwards by means of spindle 61. Account can also be taken of the so-called "topography" of the workpiece 12 through the motor 27 moving upwards or downwards the upper arm 122b of guidance means 13. However, it must be borne in mind that the spacing between the two guidance means 13 and 18 changes. The spacing must not be increased to such an extent that electrode 14 vibrates during the erosion process. Throughout the erosion process, electrode 14 is always to be held in the rotation axis 24 or in the wire centre line 23. This ensures that the remains correctly adjusted against workpiece 12 if rotary part 17 is rotated. This condition must also be fulfilled in the case of conical cutting. Conical cutting is understood to mean that the electrode 14 fixed between the guidance means 13 and 18 assumes a specific angle relative to the cutting surface of workpiece 12. Due to this conical cutting, there is an angle of slope of the cut surface 15. The angular setting of electrode 14 is brought about in that the cross-table 42 is moved in directions U and/or V until the electrode 14 assumes the desired angle. In this case, electrode 14 is positioned between guidance means 13 and 18 in such a way that it is no longer parallel or coaxial to the centre line 24.

For conical cutting, only one point of the wire electrode must be cross with the center line 24, instead of the total wire line as it has been the case so far. The crossing point should be located anywhere between guidance means 13 and 18. The crossing point is a reference for a cone which is wanted as a special workpiece cutting figure. According to the cone angle and the distance to said reference point, the position of the guidance means 18 must be adjusted using slide table 42 for P and Q. The position of the upper guidance means 13 will then be controlled depending upon the position of the lower guidance means 18, by driving means for U, V at the cross-table 41.

For reasons of completeness, it is pointed out that the spacing between the guidance means 13 and 18 can be varied by spacers and, according to FIG. 2, they are provided in arm 122a, 122b. The arrangement of one or more spacers in one or several arms 122a, 122b can be achieved without difficulty. It is dependent on the particular machining case. Such spacers are generally known, as is their fixing.

Figure 3A:
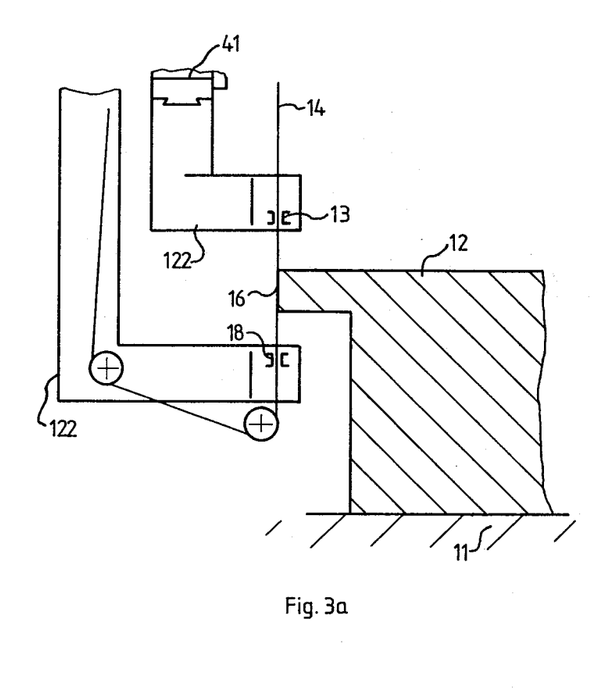
FIG. 3a the cutting of a workpiece with closed outer shape.

FIG. 3a shows punch 12 of FIG. 1b in a sectional view. The punch is also fixed to the table 11. The wire electrode 14 cuts the closed outer shape 16 on punch 12. In the manner described relative to FIG. 2, electrode 14 can cut the outer shape 16 cylindrically (as shown in FIG. 3a) or conically. The movement possibilities of arms 122 of the two guidance means 13, 18 are present in the same way as described hereinbefore. They are not impeded by any clamping means fixing punch 12 to table 11. For reasons of completeness, it is pointed out that in FIG. 3a upper arm 122 with guidance means 13 contains no rotary table 101 and no spacer 121. This indicates that members 101 and 121 can only be used in special cases, such as e.g. in FIG. 2.

Figure 3B:
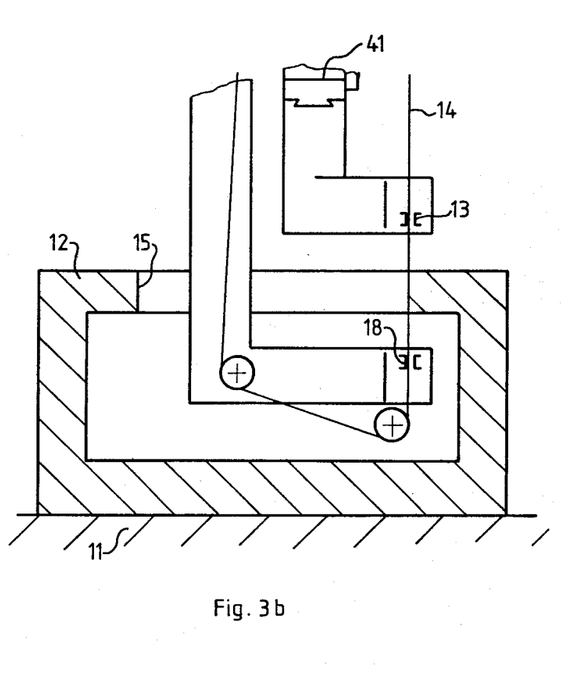
FIG. 3b the cutting of a workpiece with a closed inner shape.

FIG. 3b shows a similar sectional representation to the lower part of FIG. 2, whereby in FIG. 1a, the workpiece 12 is shown in perspective. FIG. 3b is intended to show that for any "topography" of workpiece 12, the two arms 122 of guidance means 13, 18 with an identical spacing (i.e. the reciporcal spacing of the guidance means) can carry out the erosion. This is carried out in that according to FIG. 2 only motor 192 and not motor 23 is operated. Wire electrode 14 has an unimpeded accessibility to the different cutting lines 15, which are not conical in FIG. 3b.

Figure 4:
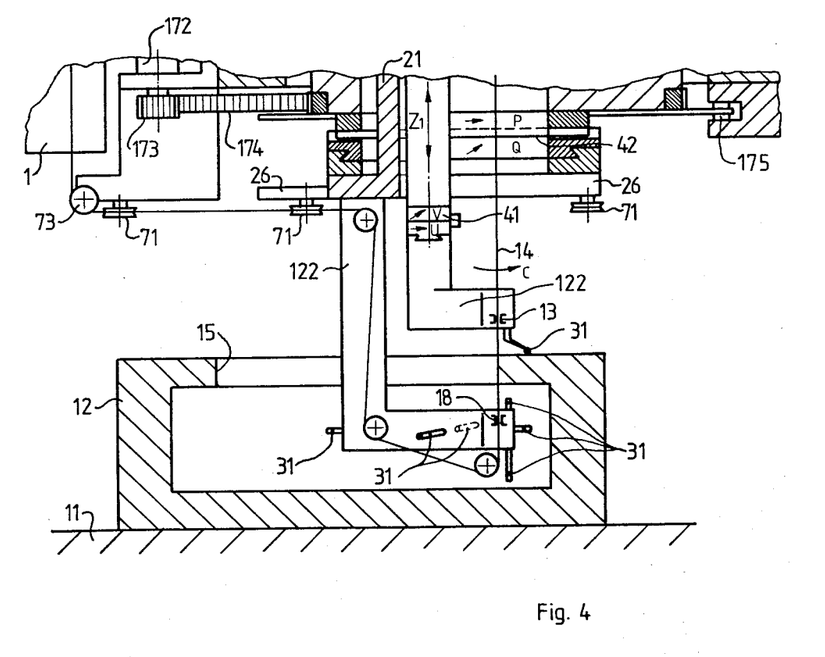
FIG. 4 a further embodiment of the invention with sensors on the guidance means.

FIG. 4 shows a further embodiment whereby sensors 31 are provided on the arms 122 of guidance means 13, 18. These sensors are known per se and are fitted to the arms as shown in FIG. 4. The sensor on upper arm 132 (guidance means 13) produces a corresponding signal if it comes into contact with the surface of workpiece 12. A plurality of sensors 31 are arranged in various ways on lower arm 122 (guidance means 18). These sensors serve to prevent a collision with the inner walls of workpiece 12. When they come into contact with one of these surfaces they produce an electrical signal. The electrical signals of sensors 31 reach the control system and starts up the corresponding movement of motors 192, 23 or 172 (FIG. 2). Motor 192 is used for moving the two guidance means 13, 18, as indicated in FIG. 2 with Z2. Motor 23 is used for moving the upper guidance means 13, indicated in FIGS. 2 and 4 with Z1. Motor 172 is used for rotating rotating mechanism 20 and according to FIGS. 2 and 4 this is carried out by means of drive 173, 174. Unlike in FIG. 2, in FIG. 4 the support structure 21 is permanently fixed to structural member 26. This is intended to show that fixing means 211 and 212 of FIG. 2 are not necessary in all cases. Motor 23 is fixed to support structure 21 and operates the upper arm 122 of guidance means 13 in direction Z1. Support structure 21 is connected to the structural member 26 and not to the fixed part 19 of the rotating mechanism. Thus, in this case, the two arms 122 move if by means of spindle 61 (FIG. 2) motor 192 moves the complete rotating mechanism upwards or downwards in direction Z2. In FIG. 2, the same members as in FIG. 2 are given the same reference numerals and are not mentioned again.

Figure 5:
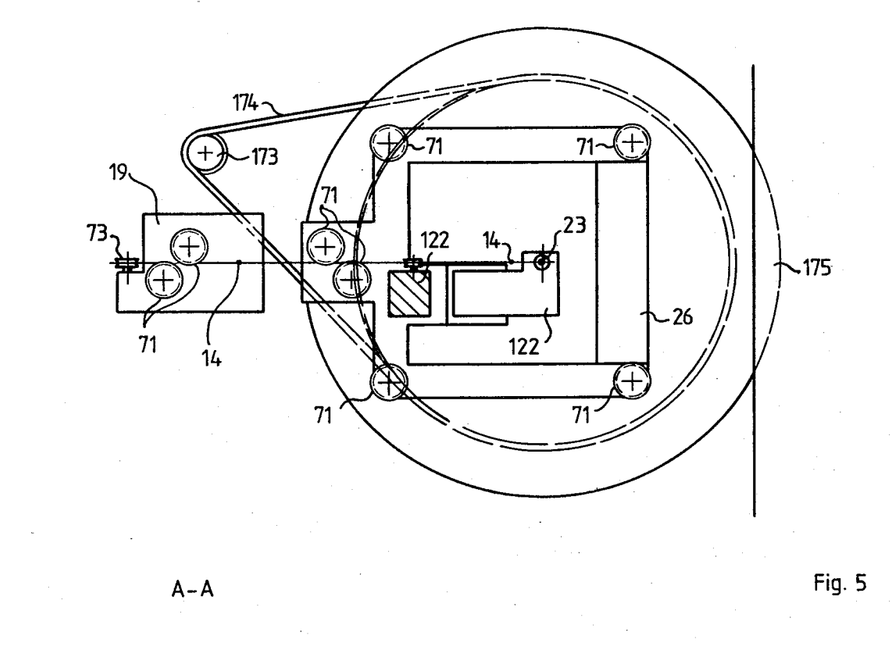
FIG. 5 an elecrode arrangement according to the invention to and from the guidance means in a sectional view along the section line A—A of FIG. 2.

FIG. 5 shows a section along the lines A-A of FIG. 2. The viewing direction is indicated by arrows, i.e. it is from bottom to top in FIG. 2. FIG. 5 shows the wire electrode which, from the supply side, passes over pulleys 73 and 71. The first pair of pulleys is located on the fixed part of the rotating mechanism. The following pair of pulleys 71 is located, like the individual pulleys 71 on structural member 26 which, with the rotary parts 17 of rotating mechanism 20, can be rotated into any random position. The lower arm 122 of guidance means 18 is shown in sectioned form, whereas the upper arm 122 with guidance means 13 is not sectioned. According to FIG. 5, wire electrode 14 passes from the second pair of pulleys 71 to the pulley of lower arm 122 and is guided by guidance means 18. From there, it passes from the guidance means 13 of upper arm 122 and then onto the discharge side 81. Wire electrode 14 is precisely positioned on the centre line 23 of rotating mechanism 20. It is assumed that during the erosion process, cutting line 15 or 16 of workpiece 12 requires a rotation of rotating mechanism 20. This takes place by controlling motor 172 which, by means of toothed gear 173 and toothed belt 174 correspondingly rotates the rotary part 17 of the rotating mechanism. For illustration purposes, it is assumed that rotary parts 17 and consequently also structural member 26, together with arms 122 are rotated in the clockwise direction. As the supply side 72 of wire electrode 14, as well as pulley 73 and the first pair of pulleys 71 remain at the same place, guide pulley 71, which in FIG. 5 is positioned below the sectioned arm 122, takes over the further guidance of wire electrode 14 to the second pair of pulleys 71 and onto the arms 122. If during the erosion process, rotating mechanism 20 must rotate further to the right, the next pulley 71, located at the right hand bottom side of FIG. 5, takes over the guidance of wire electrode 14 from the supply side. If the wire electrode discharge side is provided in the manner shown in FIG. 2, i.e. if electrode 14 is on the centre line 23 of rotating mechanism 20, said discharge side 81 requires no special guide pulleys, as indicated e.g. in FIG. 5 for the supply side. However, if the discharge side 81 of wire electrode 40 is constructed in such a way that it is no longer located on the centre line 23 of rotating mechanism 20, it is also necessary to provide a device of the type shown in FIG. 5 for the discharge side.

If the supply side 72 for wire electrode 14 can be positioned on centre line 23 or in the vicinity thereof, then the device of FIG. 5 is no longer required for the supply side. The same also applies if supply side 72 and discharge side 81 are located on the rotating mechanism 20. In this case, the relative position of supply side and discharge side to guidance means 13, 18 remains constant. In this case, a device according to FIG. 5 would not be necessary.

Figure 6:
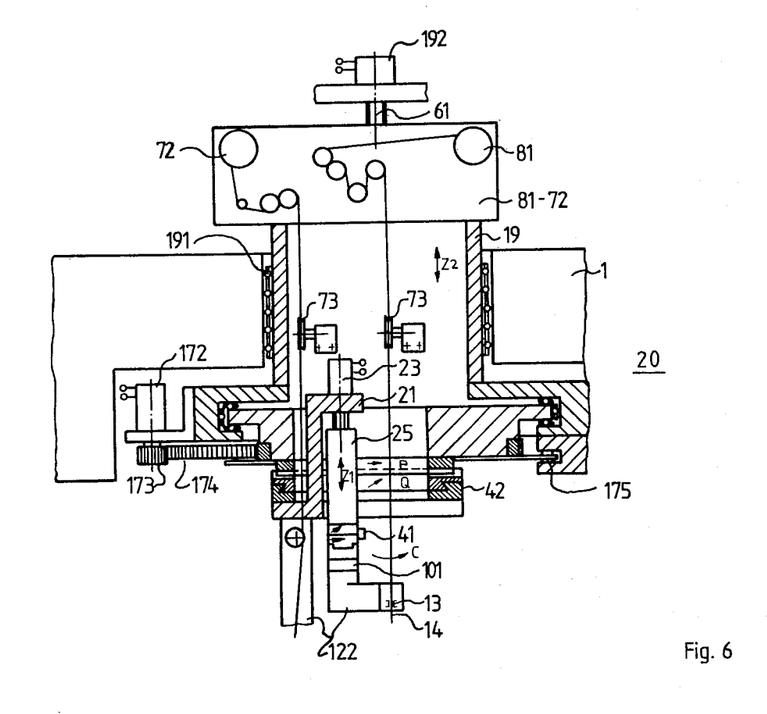
FIG. 6 a part sectional representation of an electrode supply and discharge arrangement according to the invention.

FIG. 6 shows an embodiment in which the supply side 72 and discharge side 81 of wire electrode 3 are located as close as possible to the centre line 23 of the rotating mechanism. Such an arrangement is readily possible due to corresponding guide pulleys positioned on fixed part 19 of rotating mechanism 20. It is immediately apparent that the supply and discharge sides of the wire electrode can be positioned on the rotary member 17, e.g. on structural member 26. FIG. 6 will not be discussed in detail because the structural members are the same as in FIGS. 2, 3 and 4 and therefore have the same reference numerals.

I claim:

1. Erosive cutting machine for the final machining of prepared closed inner shapes and closed outer shapes of a workpiece (12) having
   a workpiece holder (11) to retain the workpiece;
   a filamentary or strip electrode (14);
   and guidance means, including upper and lower guide elements (13, 18), for guiding the electrode through a working or cutting zone (1318) comprising
   a motor rotatable rotary mechanism (20) having an axis of rotation (24) which has a common reference point on the axis (23) of the electrode (14);
   a first cross slide (41) which is controllably driven for controlling any desired cutting cone and which carries an upper arm (122b);
   a second cross slide (42) which is controllably driven and positioning the wire guidance means (13, 18) on said reference point;
   and means (27) for continuous adjustment (Z1) of the distance between the upper and lower guidance elements (13, 18).

2. Machine according to claim 1, wherein, for cutting of shapes of circular outline, the rotating mechanism (20) has an axis of rotation (24) which coincides with the axis (23) of the electrode (14) on at least one point within the working or cutting zone (1318).

3. Machine according to claim 1, including means (192) for controlled vertical adjustment of the rotary mechanism (20) to adjust the location of the cutting zone (1318) according to the requirements of the workpiece (12).

4. Machine according to claim 1, wherein the first cross slide (41) includes vertical guidance means (Z1);
   and connecting means (211, 212) for connecting the vertical guidance means (Z1) of the first cross slide (41) selectively
   (a) with the second cross slide (42), or
   (b) with the fixed part (19) of the rotary mechanism (20).

5. Machine according to claim 1, wherein the first cross slide (41) positions the axis (23) of the electrode (14) coaxially with the axis of rotation (24) of the rotary mechanism (20);
   and the second cross slide (42) positions the guidance means (18) for centering the axis (23) of the electrode (14) on said axis of rotation (24) of the rotary mechanism.

6. Machine according to claim 1 or 2, wherein both the first and second guidance elements are fixed to a rotary part (17) of the rotary mechanism (20).

7. Machine according to claim 1 or 5, wherein one guidance element (13) is fixed to a fixed part (19) of the rotary mechanism and the other guidance element (18) is fixed to a rotary part (17) of the rotary mechanism.

8. Machine according to claim 1, wherein the rotary mechanism (20) comprises
   a support (21) for supporting one (13) of the guidance elements;
   and attachment means (211, 212) for the selective attachment of the support to a rotary part (17) or to a fixed part (19) of the rotary mechanism (20).

9. Machine according to claim 1, wherein at least one guidance element (13) is secured to one (41) of the cross slides (41, 42) for setting a particular angle of the electrode (14) with respect to a surface of the workpiece (12).

10. Machine according to claim 1, including a translating mechanism (61);
    and wherein both guidance elements (13, 18) are located on a translating mechanism for translation of both guidance elements at a constant spacing.

11. Machine according to claim 10, wherein the translating mechanism (61) includes means for translation and process-controlled displacement of both guidance elements, while maintaining constant spacing with respect to one another, and further maintaining the angular relative position between the electrode wire (14) and a surface of the workpiece (12).

12. Machine according to claim 1, including at least one collision detector (41) coupled to the guidance means (13, 18) for detecting collision between the guidance means and an inner or outer surface of the workpiece (12).

13. Machine according to claim 1, wherein the rotary mechanism (20) comprises a rotary part (17) including a structural member (26);
    pulleys (71) are provided, uniformly arranged over the periphery of the structural member;
    and a reeling means (72, 81) is provided for supply and removal of the electrode (14) to and from the work zone (1318), the pulleys guiding the electrode between the guidance means (13, 18) and said reeling means (72, 81).

14. Machine according to claim 13, wherein the reeling means (72, 81) are secured to the rotary mechanism (20) and perform rotary movement therewith so that, upon operation of the rotary mechanism, the relative position of the reeling means with respect to the guidance means remains unchanged.

15. Machine according to claim 13, wherein the reeling means (72, 81) is positioned close to the axis of rotation (24) of the rotary mechanism (20) and spaced from said axis by a distance in which, upon operation of the rotary mechanism, the variation in the relative position of the reeling means with respect to the guidance means does not exceed a predetermined value.

16. Machine according to claim 1, wherein the cross slides (41, 42) operate in a Cartesian system of coordinates;
    and a rotary table (101) operating in a polar system of coordinates is provided, coupled to one (13) of the guidance elements to provide for conical cuts on the workpiece by the electrode (14).

17. Machine according to claim 1, including interchangeable spacing means positioning at least one (13) of said guidance elements for changing the distance between said elements.

* * * * *